US012565972B1

(12) United States Patent
Zhao et al.

(10) Patent No.: US 12,565,972 B1
(45) Date of Patent: Mar. 3, 2026

(54) SOLAR SWIMMING POOL WALL LIGHT

(71) Applicant: SICHUAN COOTWAY TECHNOLOGY CO., LTD., Deyang (CN)

(72) Inventors: Chunhai Zhao, Deyang (CN); Daiquan Li, Deyang (CN)

(73) Assignee: SICHUAN COOTWAY TECHNOLOGY CO., LTD., Deyang (CN)

( * ) Notice: Subject to any disclaimer, the term of this patent is extended or adjusted under 35 U.S.C. 154(b) by 0 days.

(21) Appl. No.: 19/373,638

(22) Filed: Oct. 29, 2025

(30) Foreign Application Priority Data

Oct. 17, 2025 (CN) .......................... 202522197242.0

(51) Int. Cl.
| | |
|---|---|
| *F21S 9/03* | (2006.01) |
| *E04H 4/14* | (2006.01) |
| *F21V 21/088* | (2006.01) |
| *F21V 21/108* | (2006.01) |
| *F21V 21/30* | (2006.01) |
| *F21V 23/00* | (2015.01) |
| *G01K 1/02* | (2021.01) |
| *G01K 1/14* | (2021.01) |
| *G01K 13/02* | (2021.01) |
| *F21W 131/401* | (2006.01) |
| *F21Y 105/16* | (2016.01) |

(52) U.S. Cl.
CPC .............. *F21S 9/035* (2013.01); *E04H 4/148* (2013.01); *F21V 21/088* (2013.01); *F21V 21/108* (2013.01); *F21V 21/30* (2013.01); *F21V 23/008* (2013.01); *G01K 1/028*

(2013.01); *G01K 1/14* (2013.01); *G01K 13/026* (2021.01); *F21W 2131/401* (2013.01); *F21Y 2105/16* (2016.08)

(58) Field of Classification Search
CPC .... G01K 13/026; G01K 13/025; G01K 13/14; F21W 2131/401
See application file for complete search history.

(56) References Cited

U.S. PATENT DOCUMENTS

| | | | |
|---|---|---|---|
| 3,801,022 A | 4/1974 | Cassey | |
| 3,955,076 A | 5/1976 | Shaw | |
| 5,681,110 A * | 10/1997 | Burzacchi | ................ G01K 1/06 |
| | | | 374/208 |
| 6,568,823 B1 | 5/2003 | Fielding et al. | |
| 12,098,835 B1 * | 9/2024 | Shen | ....................... E04H 4/148 |
| 2025/0389412 A1 * | 12/2025 | Huang | .................. F21V 21/088 |

OTHER PUBLICATIONS

Innovation Q+ NPL Search (Year: 2025).*

* cited by examiner

*Primary Examiner* — Anabel Ton

(57) ABSTRACT

A solar swimming pool wall light includes a base, a connecting rod, and a light body. The base is mounted on the edge of a swimming pool, a solar panel is arranged on the base. The connecting rod has a first end and a second end, with the first end connected to the base and the second end extending downward and being retractable to adjust the height of the light body. The light body is connected to the second end of the connecting rod, with the light body and the base being electrically connected. A temperature probe is also arranged on the light body; and a display screen is arranged on the base to display temperature information detected by the temperature probe.

15 Claims, 23 Drawing Sheets

C

D-D

E

F

340

330

322

321

360

320

350

310

SOLAR SWIMMING POOL WALL LIGHT

RELATED APPLICATIONS

The present patent document claims the benefit of priority to Chinese Patent Application No. 202522197242.0, filed Oct. 17, 2025, the entire content of which is incorporated herein by reference.

BACKGROUND

1. Technical Field

The present disclosure relates to lights, and in particular to a solar swimming pool wall light.

2. Background Information

A swimming pool wall light is a specially designed luminaire used to provide illumination in swimming pools. It is typically installed on the edges or walls of the pool to enhance lighting in the pool area. However, most existing wall lights generally offer only basic illumination, resulting in relatively limited functionality and reduced practicality in real-world applications.

BRIEF SUMMARY

The first aspect of the embodiments of the present disclosure provides a solar swimming pool wall light, including: a base mounted on an edge of a pool, the base being provided with a solar panel and a display screen; a connecting rod having a first end and a second end, the first end being connected to the base and the second end extending downward; a light body connected to the second end of the connecting rod; a control circuit board arranged within the base and being electrically connected to the solar panel, the display screen, and the light body; and a temperature probe arranged on the light body, at least a portion of the light body being configured to extend into pool water to allow the temperature probe to contact the pool water and detects a temperature of the pool water; data detected by the temperature probe being configured to be transmitted and displayed on the display screen.

BRIEF DESCRIPTION OF THE DRAWINGS

The drawings in the specification, which constitute a part of the present disclosure, are used to provide further understanding of the present disclosure. The illustrative embodiments of the present disclosure and their descriptions are for explanation purposes and do not constitute improper limitations on the present disclosure.

DETAILED DESCRIPTION OF THE DRAWINGS AND THE PRESENTLY PREFERRED EMBODIMENTS

Figure 1:
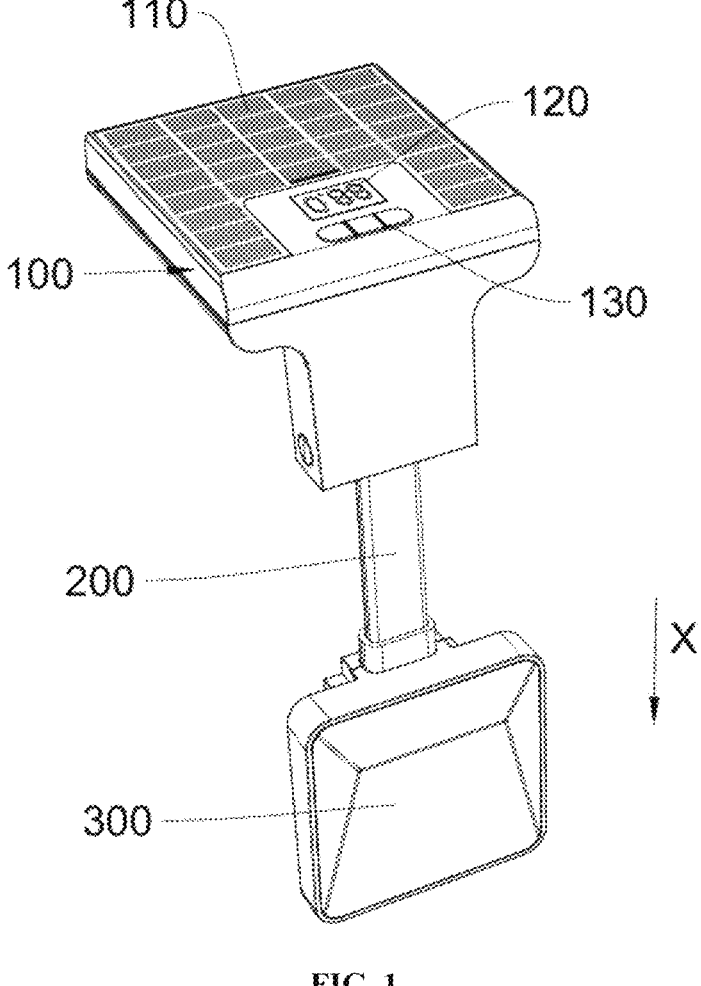
FIG. 1 is a perspective view of a swimming pool wall light according to some embodiments of the present disclosure.
Figure 2:
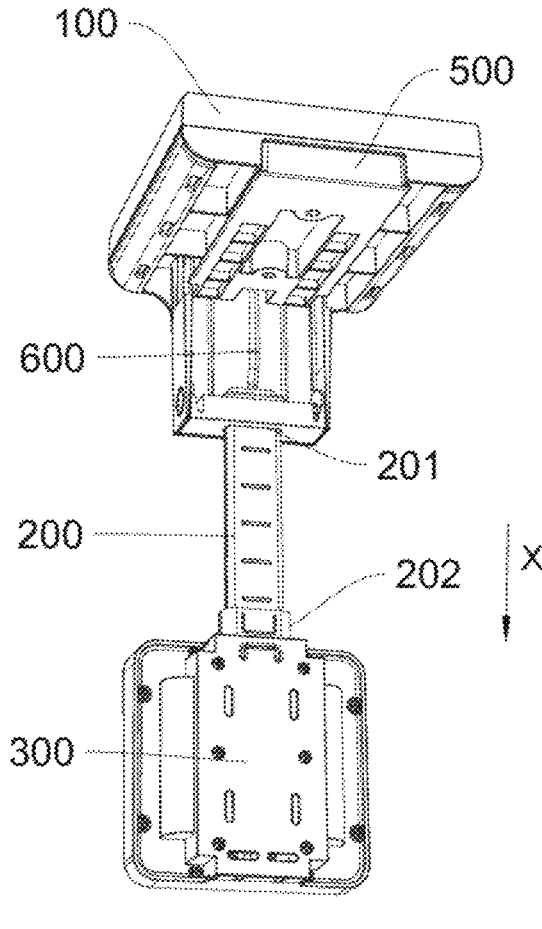
FIG. 2 is another perspective view according to some embodiments of the present disclosure.

The present disclosure will be described in detail below with reference to the accompanying drawings and in conjunction with examples. Each example is provided by way of explanation of the present disclosure and is not intended to limit the present disclosure. Indeed, those skilled in the art will appreciate that modifications and variations may be made herein without departing from the scope or spirit of the present disclosure. For example, a feature illustrated or described as part of some embodiments may be used in another embodiment to produce yet another embodiment. Therefore, it is intended that the present disclosure encompasses such modifications and variations as come within the scope of the appended claims and their equivalents.

In the description of the present disclosure, terms such as "longitudinal," "transverse," "upper," "lower," "front," "rear," "left," "right," "vertical," "horizontal," "top," and "bottom" indicate orientations or positional relationships based on the orientations or positional relationships shown in the accompanying drawings. These terms are provided solely for ease of description and do not require that the present disclosure be constructed or operated in a specific orientation. Therefore, they should not be construed as limiting the present disclosure. The terms "connected," "connection," and "arranged" used in the present disclosure should be interpreted broadly. For example, they can refer to fixed or detachable connections; direct or indirect connections through intermediate components; wired electrical connections, radio connections, or wireless communication signal connections. Those skilled in the art will understand the specific meanings of these terms based on the specific circumstances.

The accompanying drawings illustrate one or more examples of the present disclosure. The detailed description uses numbers and letters to refer to features in the drawings. Like or similar numbers in the drawings and description have been used to refer to like or similar parts of the present disclosure. As used herein, the terms "first," "second," and "third" are used interchangeably to distinguish one component from another and are not intended to indicate the location or importance of individual components.

The present disclosure provides a solar swimming pool wall light, including: a base 100, a connecting rod 200, a light body 300, and a control circuit board 700.

As shown in FIGS. 1-3 and 24-26, the base 100 is mounted on the edge of a pool. The connecting rod 200 has a first end 201 and a second end 202. The first end 201 is connected to the base 100, and the second end 202 extends downward to reach into the pool. The light body 300, the core lighting component, is mounted on the second end 202 of the connecting rod 200, providing direct illumination within the pool. The length of the connecting rod 200 can be flexibly adjusted to the pool's depth, ensuring that the light body 300 at the second end 202 precisely reaches the optimal lighting position within the pool. A solar panel 110 is integrated into the top of the base 100, capturing sunlight and converting it into electricity. A control circuit board 700 is arranged within the base 100. Both the light body 300 and the solar panel 110 are electrically connected to the control circuit board 700, allowing the electricity generated by the solar panel 110 to be processed and transmitted to the light body 300, providing power for illumination. In some embodiments, the control circuit board 700 can also be arranged within the light body 300.

In some embodiments, a temperature probe 400 is provided on the light body 300. At least a portion of the light body 300 extends into the pool water, allowing the temperature probe 400 to directly contact the pool water for real-time monitoring of the pool temperature. A display screen 120 is mounted on the base 100. A control circuit board 700 is electrically connected to the display screen 120 and the temperature probe 400, respectively. This allows the control circuit board 700 to process the electricity generated by the solar panel 110 and transmit it to the temperature probe 400 and the display screen 120, respectively, providing power for the operation of the temperature probe 400 and the display screen 120. Furthermore, the temperature data detected by the temperature probe 400 is processed by the control circuit board 700 and transmitted to the display screen 120 for real-time display, allowing the user to monitor the pool water temperature at any time.

Figures 3, 4:
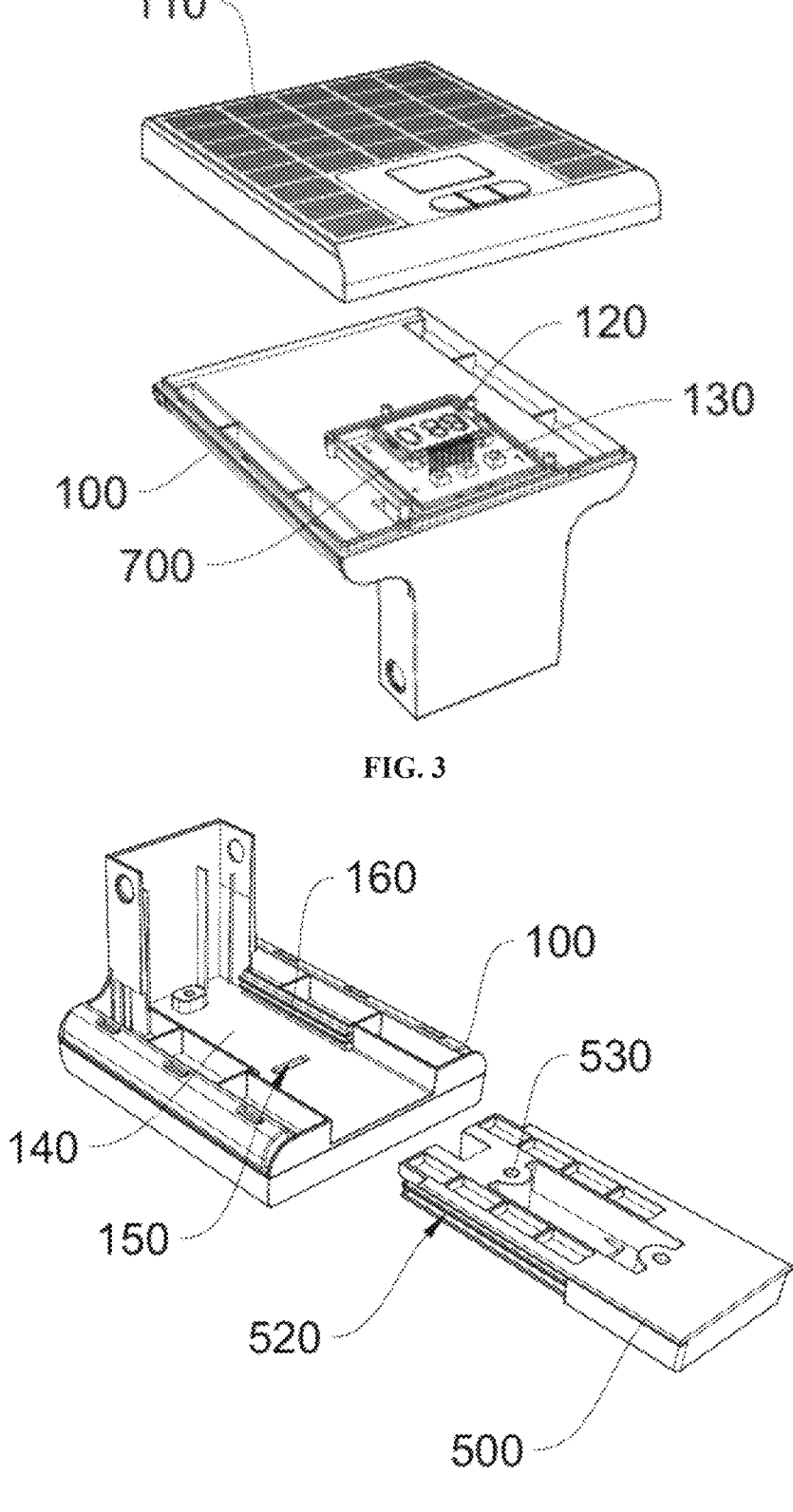
FIG. 3 is an exploded view of a base according to some embodiments of the present disclosure.
FIG. 4 is a perspective view of a base and a fixing assembly according to some embodiments of the present disclosure.
Figure 5:
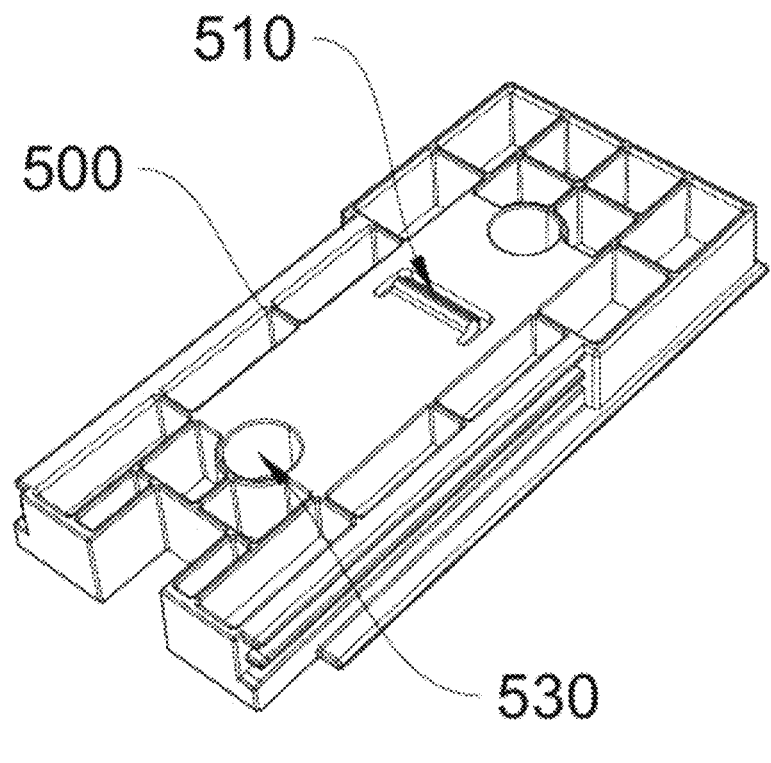
FIG. 5 is a perspective view of a fixing assembly according to some embodiments of the present disclosure.
Figure 6:
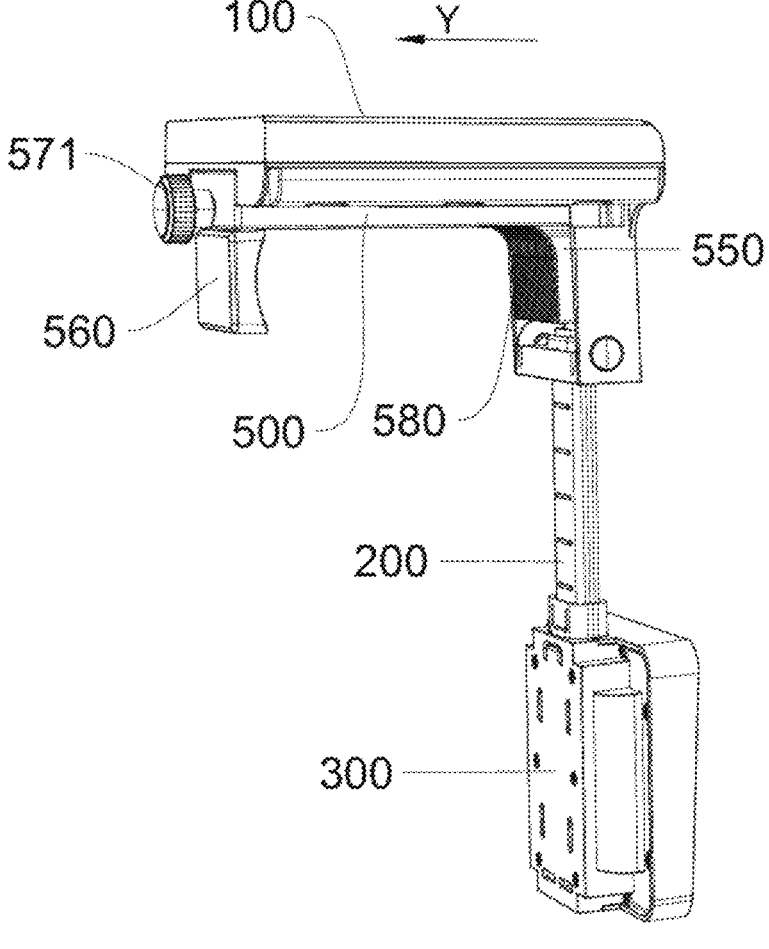
FIG. 6 is a perspective view of a swimming pool wall light according to some embodiments of the present disclosure.
Figure 7:
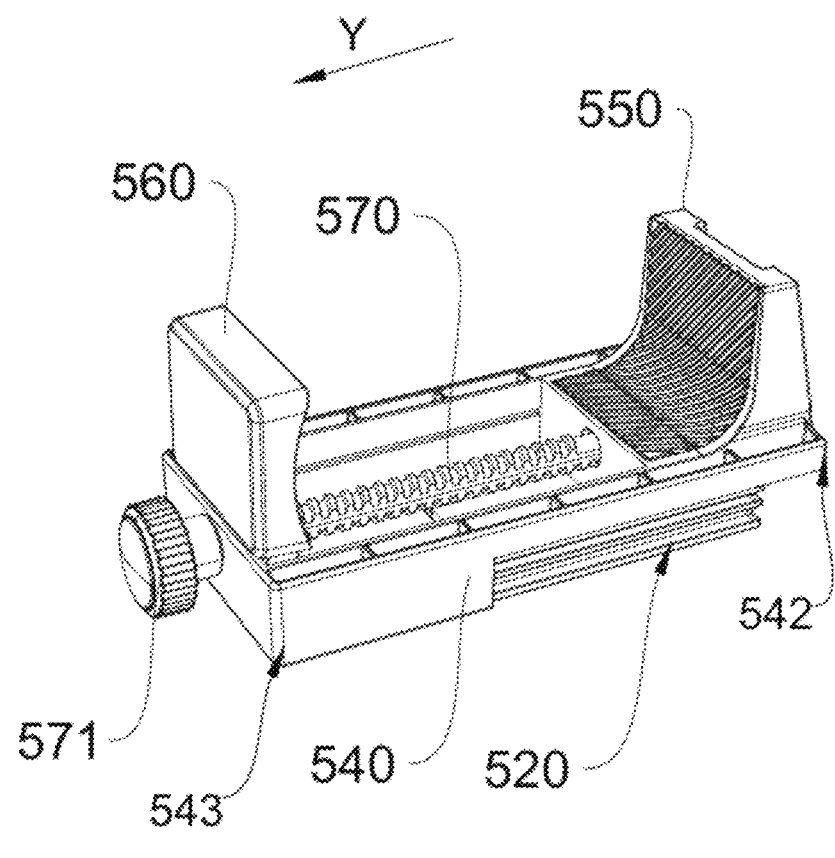
FIG. 7 is a perspective view of a fixing assembly according to some embodiments of the present disclosure.
Figure 8:
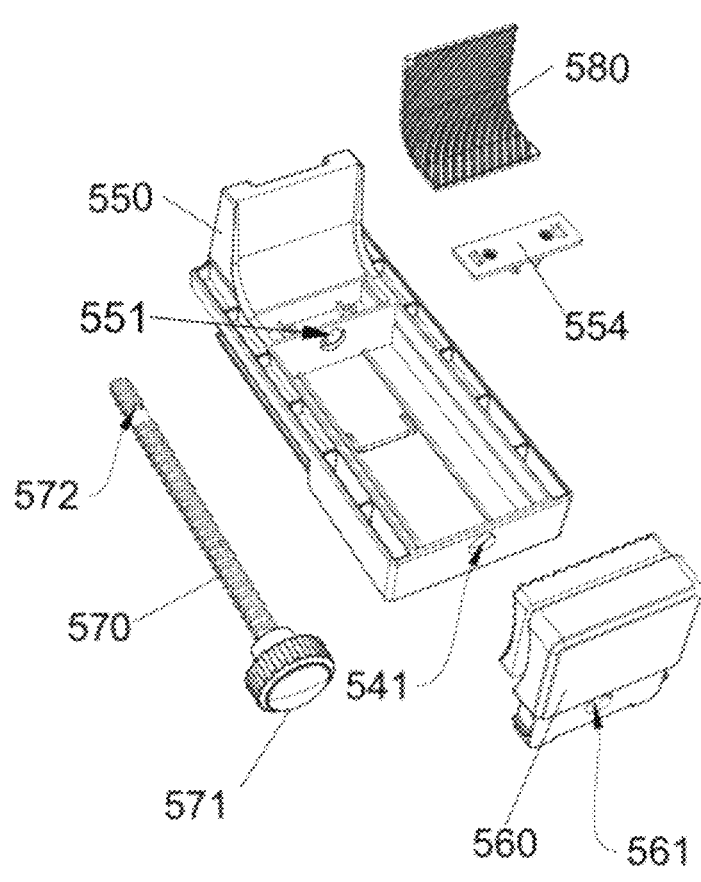
FIG. 8 is an exploded view of a fixing assembly according to some embodiments of the present disclosure.
Figure 9:
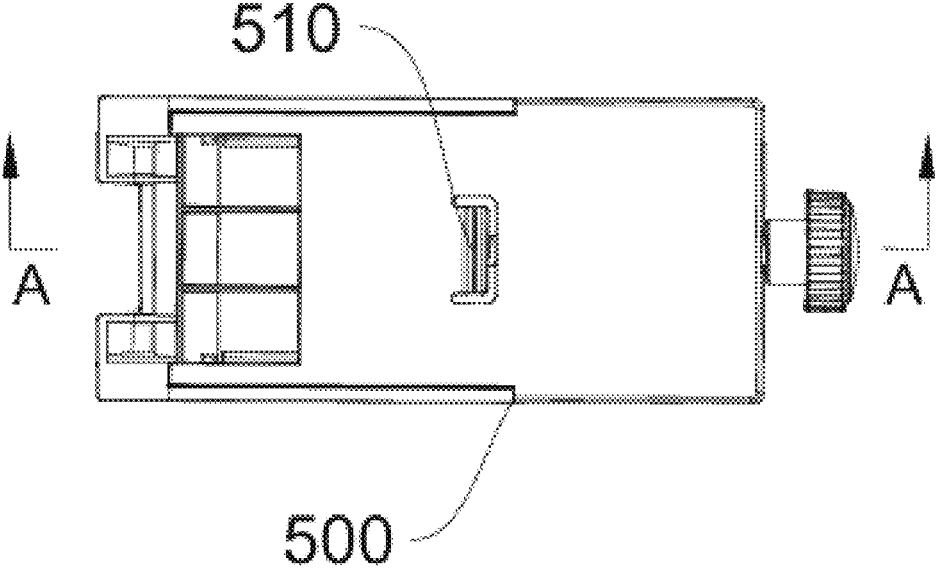
FIG. 9 is another perspective view of a fixing assembly according to some embodiments of the present disclosure.
Figure 10:
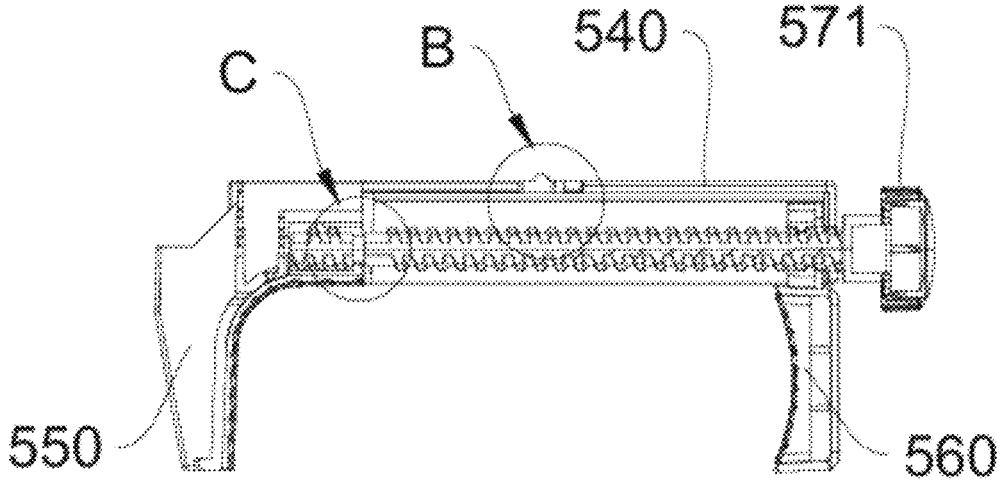
FIG. 10 is a cross-sectional view along the line A-A in FIG. 9.
Figure 11:
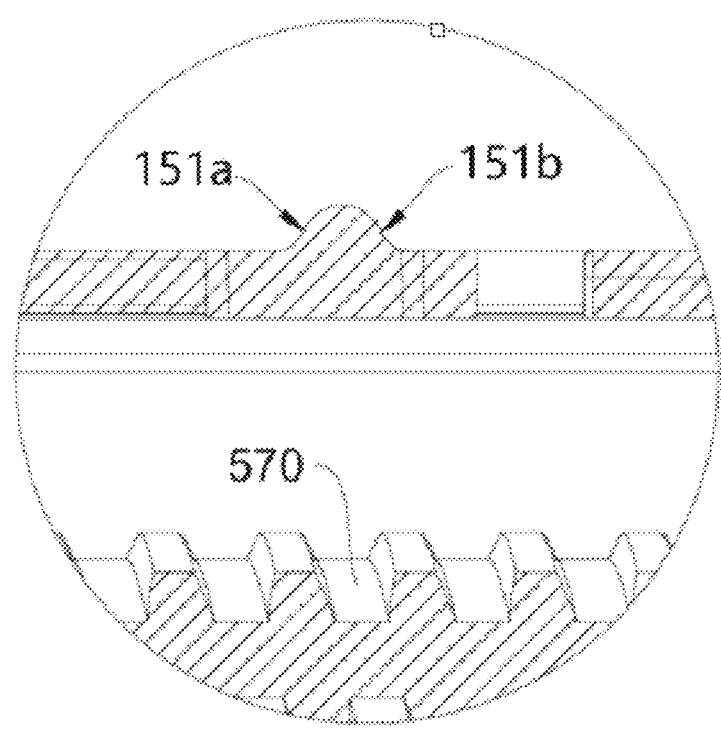
FIG. 11 is an enlarged view of area B in FIG. 10.
Figure 12:
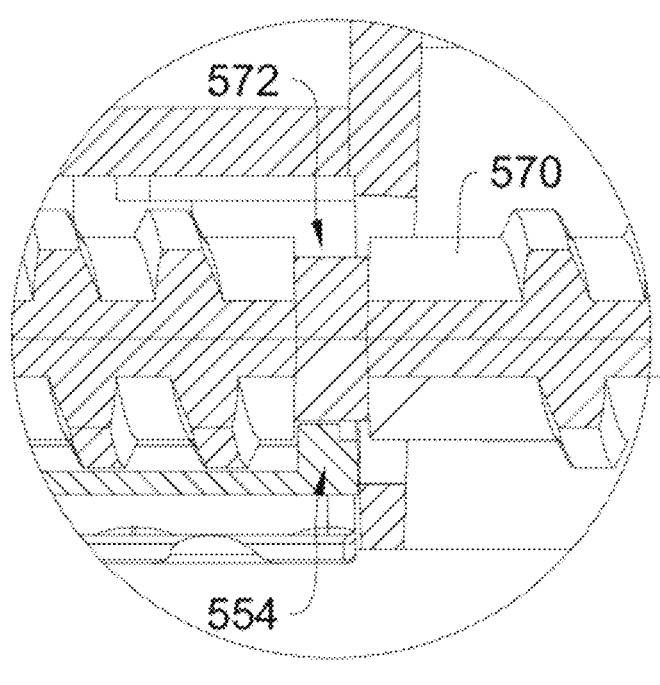
FIG. 12 is an enlarged view of area C in FIG. 10.
Figure 13:
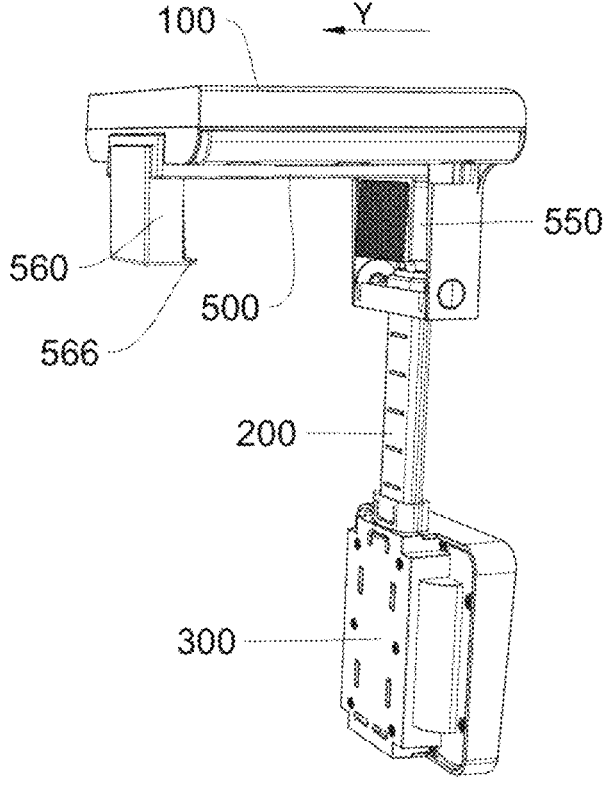
FIG. 13 is a perspective view of a swimming pool wall light according to some embodiments of the present disclosure.
Figure 14:
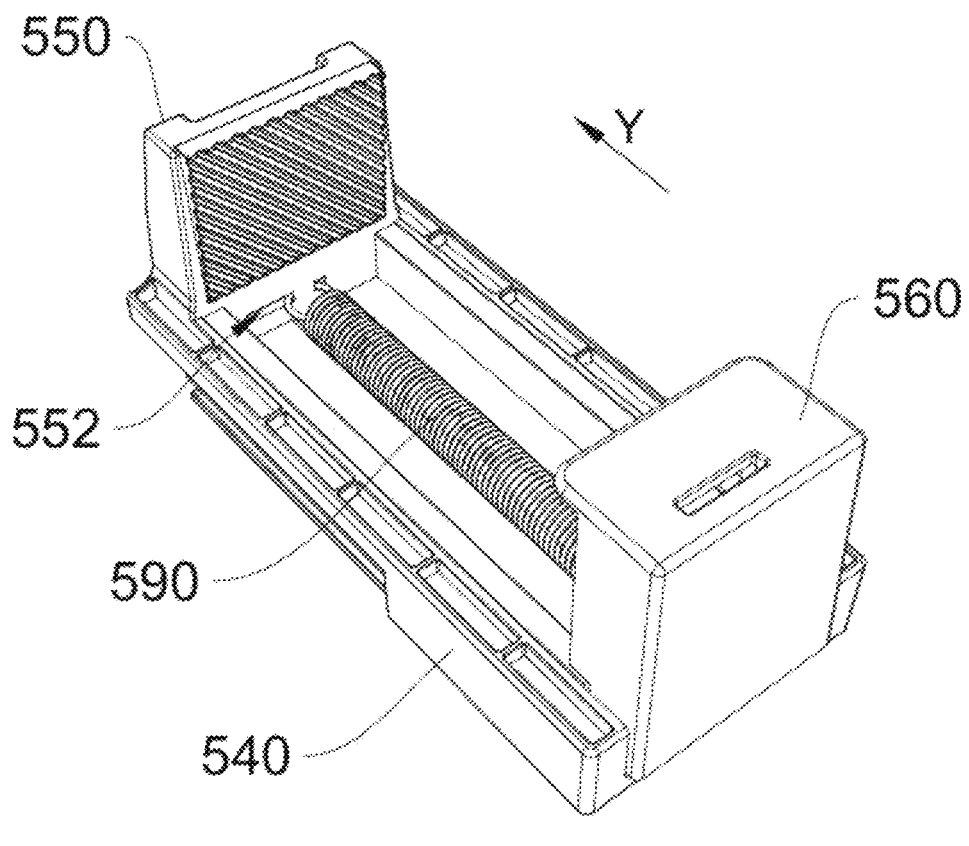
FIG. 14 is a perspective view of a fixing assembly according to some embodiments of the present disclosure.
Figure 15:
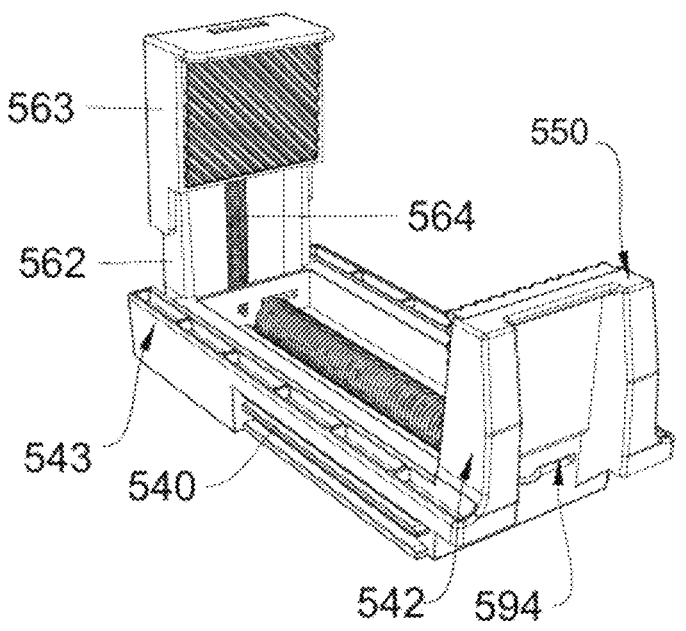
FIG. 15 is a perspective view of a fixing assembly in another state according to some embodiments of the present disclosure.
Figure 16:
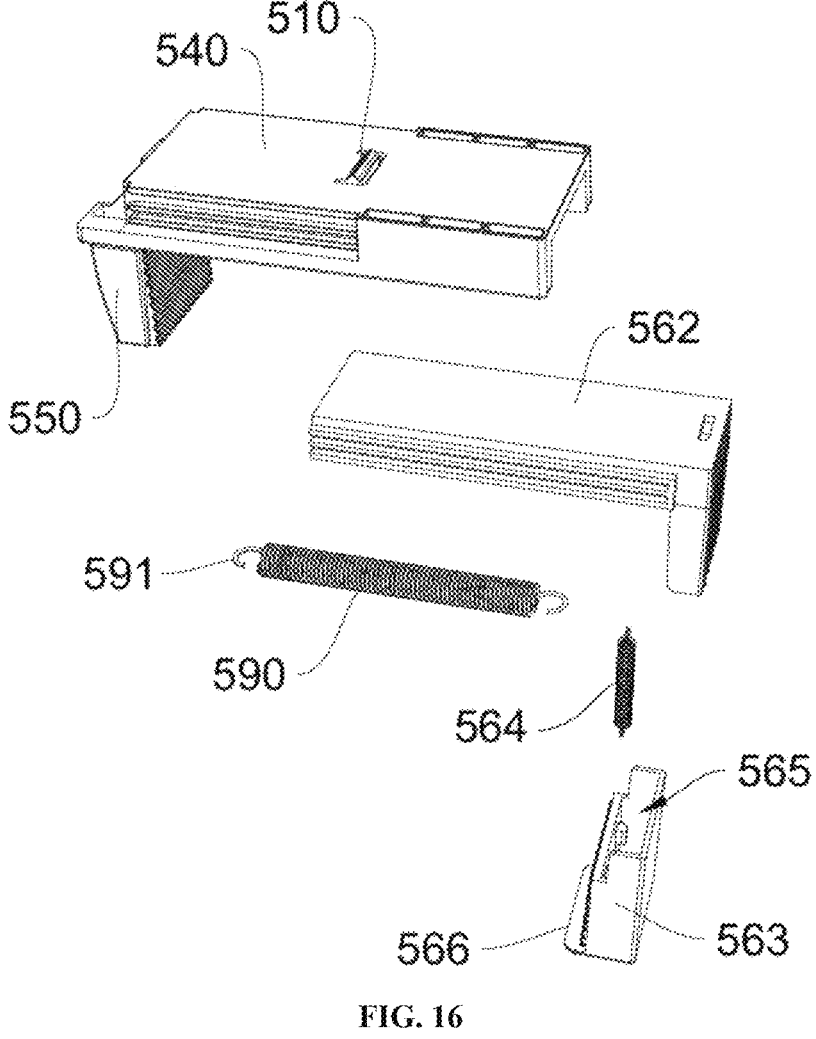
FIG. 16 is an exploded view of a fixing assembly in some embodiments of the present disclosure.
Figure 17:
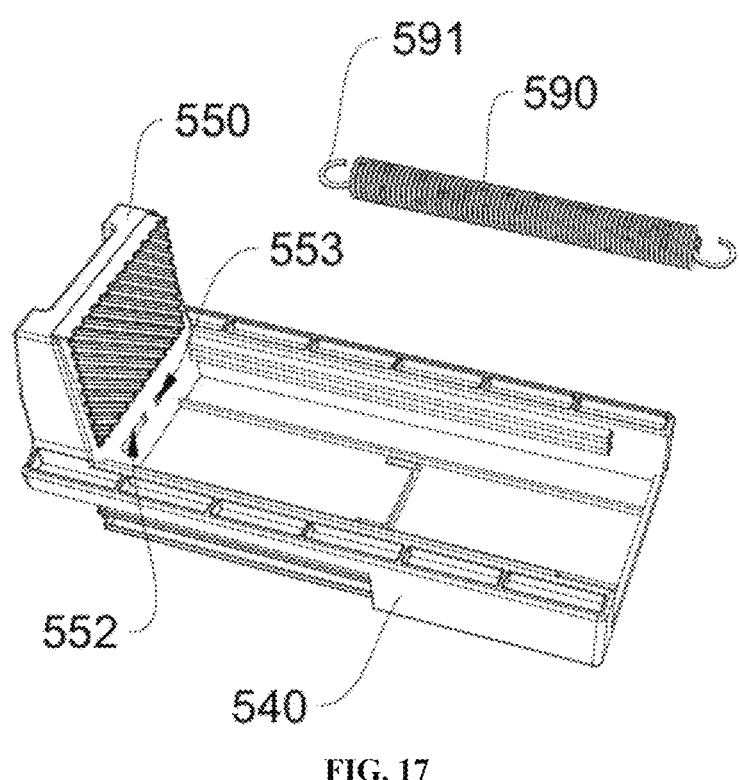
FIG. 17 is a perspective view of an assembly body and a first spring according to some embodiments of the present disclosure.
Figure 18:
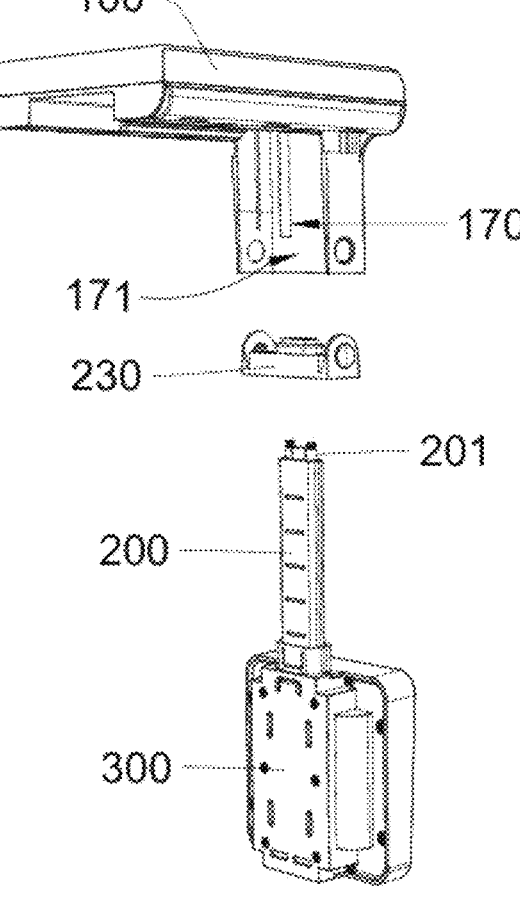
FIG. 18 is a perspective view of a base, a connecting rod, and a light body according to some embodiments of the present disclosure.
Figure 19:
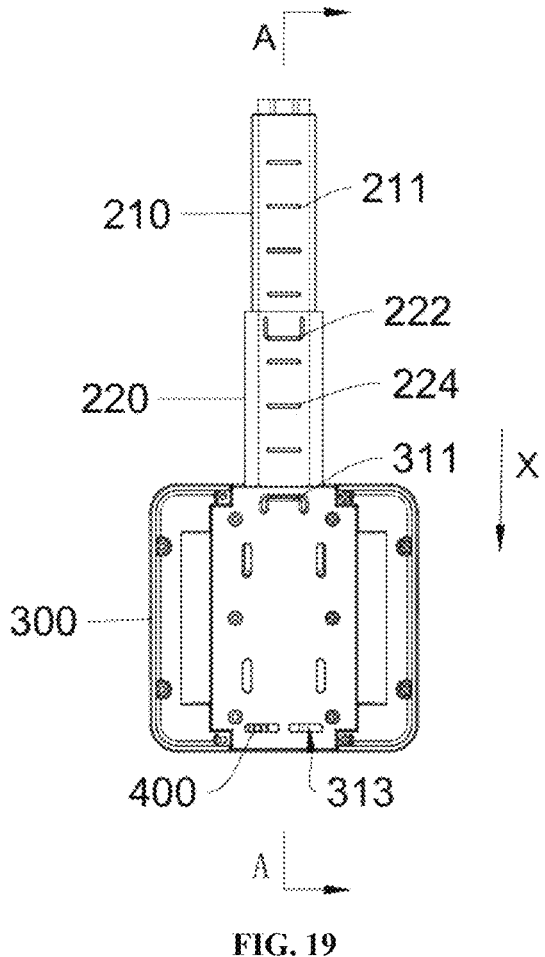
FIG. 19 is a perspective view of a connecting rod and a light body according to some embodiments of the present disclosure.
Figure 20:
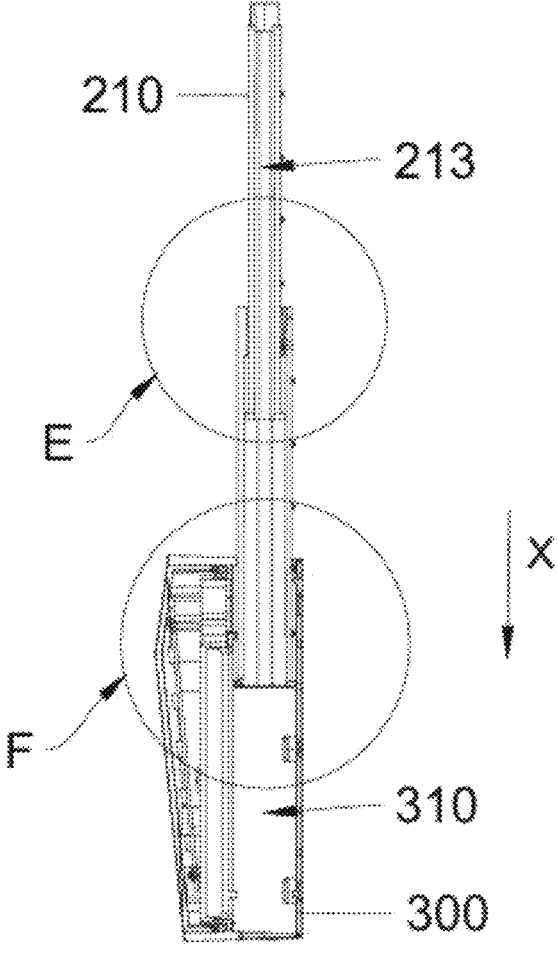
FIG. 20 is a cross-sectional view taken along the line D-D of FIG. 19.
Figure 21:
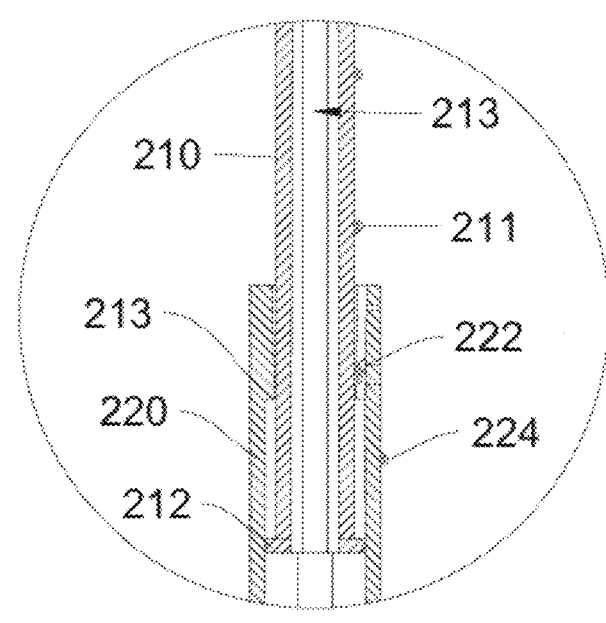
FIG. 21 is an enlarged view of area E in FIG. 20.
Figure 22:
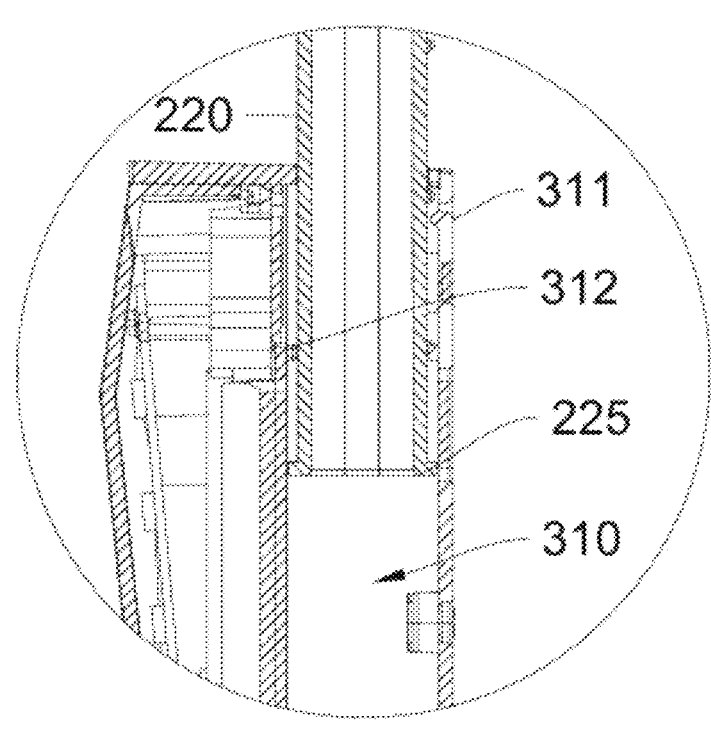
FIG. 22 is an enlarged view of area F in FIG. 20.
Figure 23:
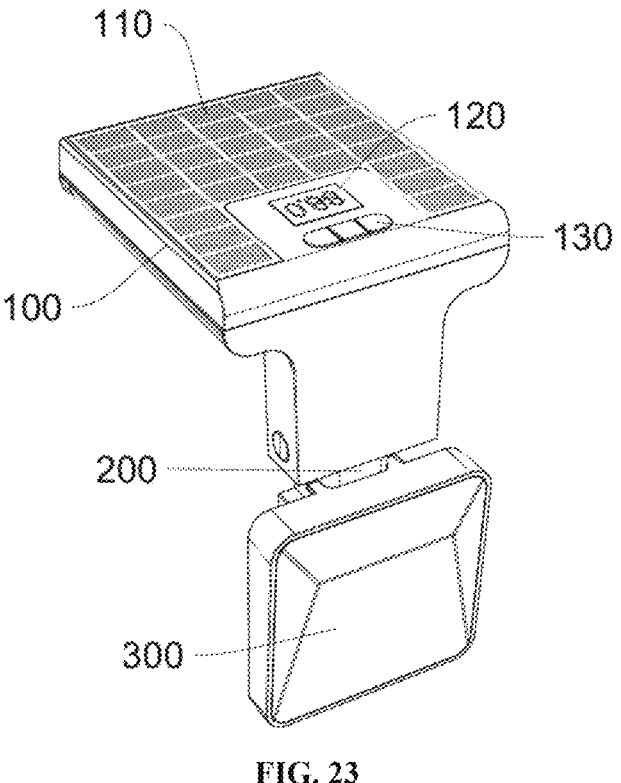
FIG. 23 is a perspective view of a swimming pool wall light in another state according to some embodiments of the present disclosure.
Figure 24:
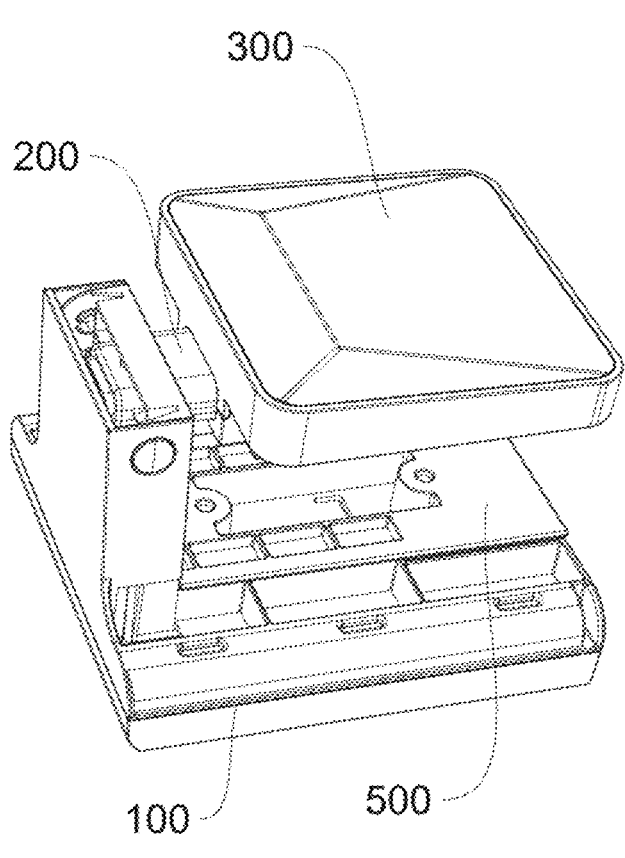
FIG. 24 is a perspective view of a swimming pool wall light in another state according to some embodiments of the present disclosure.
Figure 25:
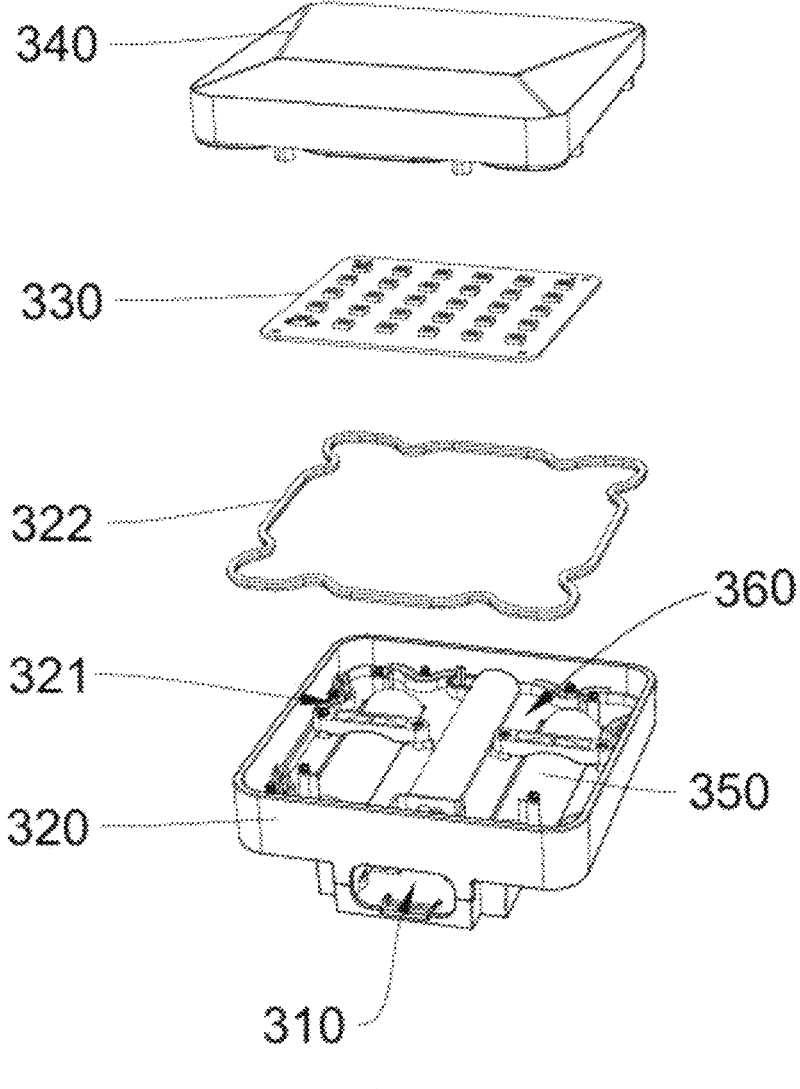
FIG. 25 is an exploded view of a light body according to some embodiments of the present disclosure.
Figure 26:
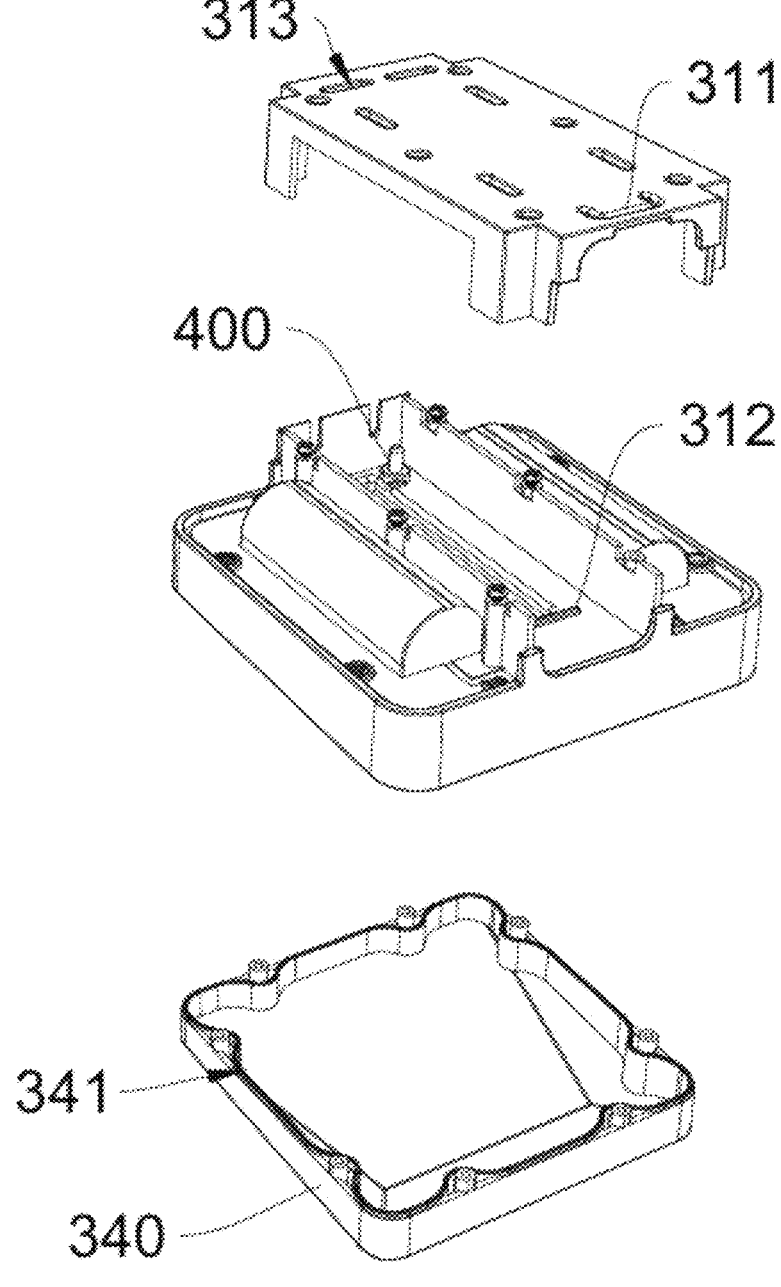
FIG. 26 is a perspective view of a light holder and a lightshade according to some embodiments of the present disclosure.
Figure 27:
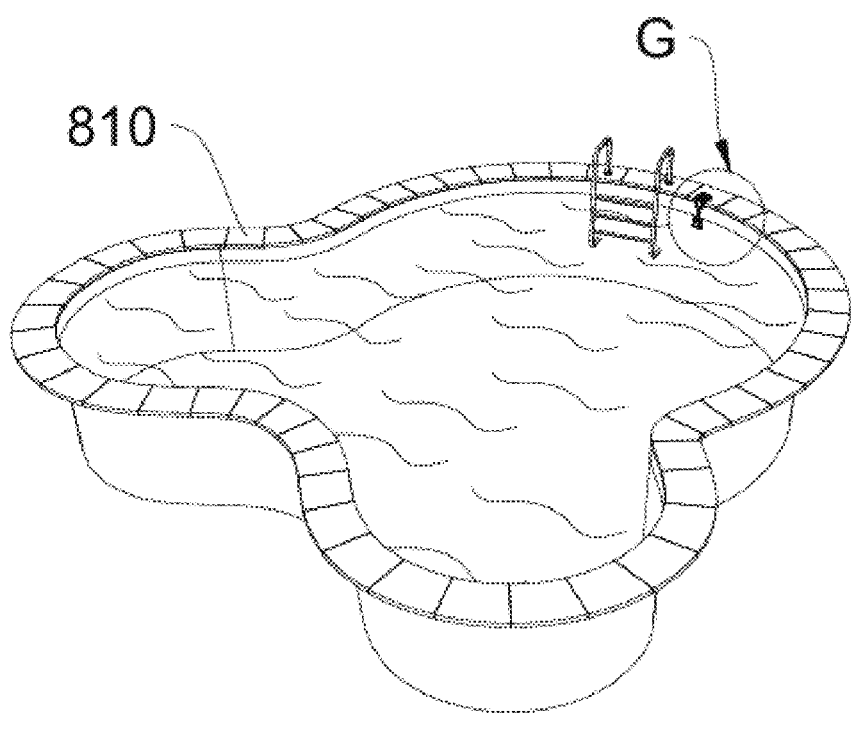
FIG. 27 is a perspective view of a swimming pool wall light installed in an underground swimming pool according to some embodiments of the present disclosure.
Figure 28:
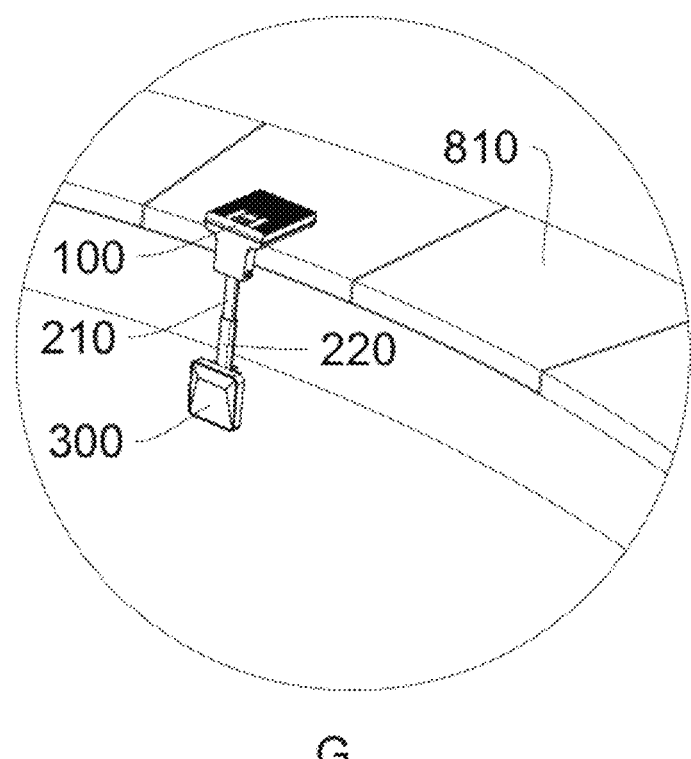
FIG. 28 is an enlarged view of area G in FIG. 27.
Figure 29:
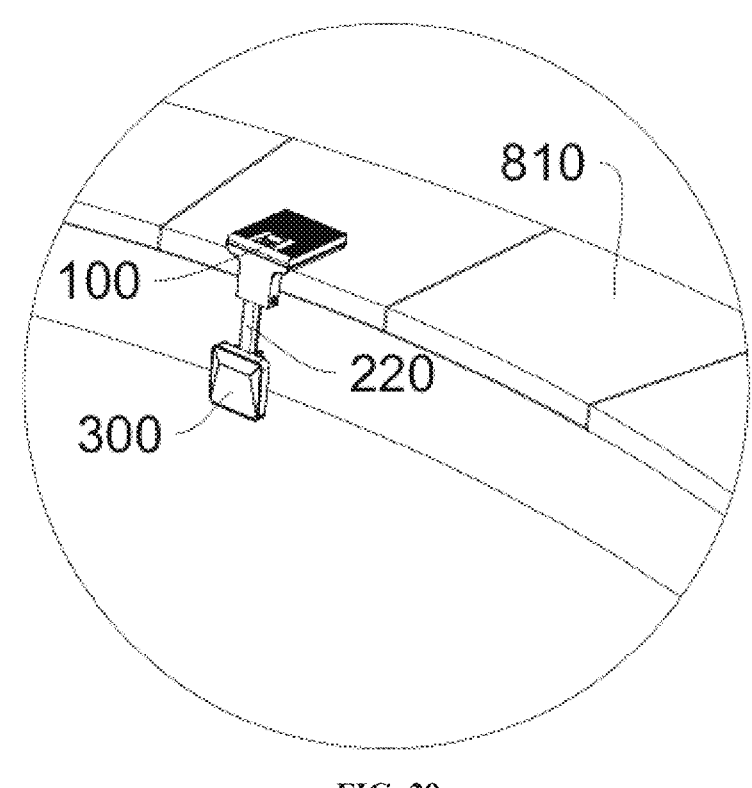
FIG. 29 is a perspective view of a swimming pool wall light in another state in FIG. 27.
Figure 30:
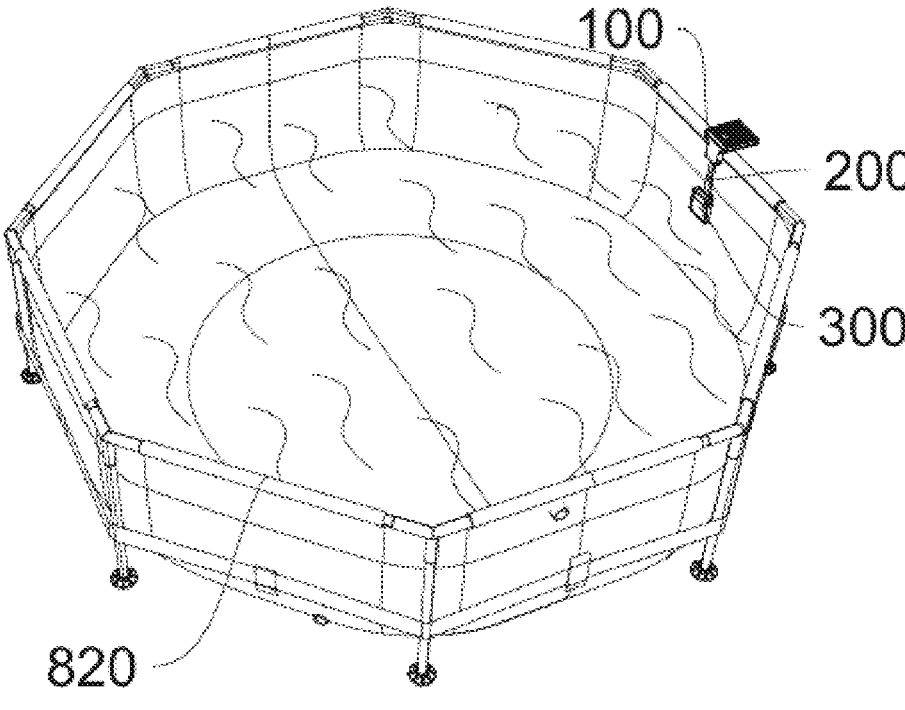
FIG. 30 is a perspective view of a swimming pool wall light installed on a bracket according to some embodiments of the present disclosure.
Figure 31:
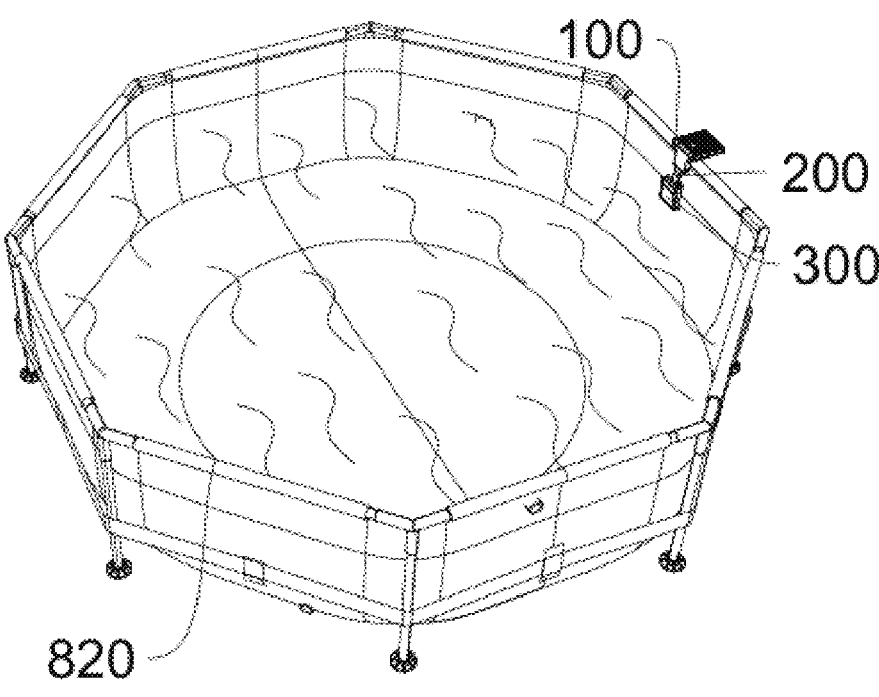
FIG. 31 is a perspective view of a swimming pool wall light installed on a bracket in another state, according to some embodiments of the present disclosure.
Figure 32:
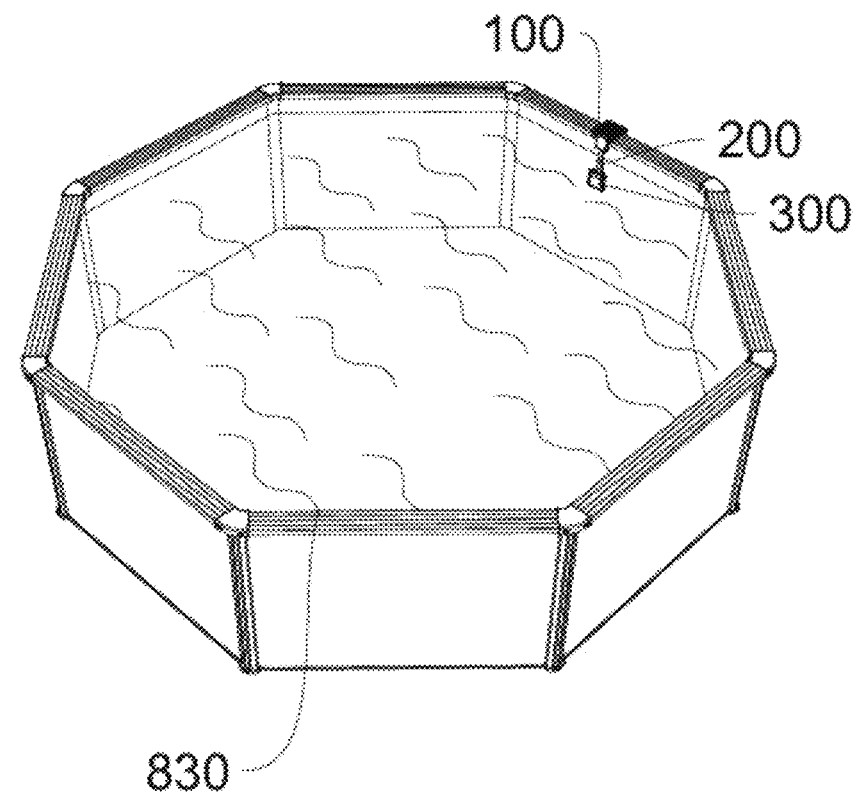
FIG. 32 is a perspective view of a swimming pool wall light installed on a steel pool according to some embodiments of the present disclosure.
Figure 33:
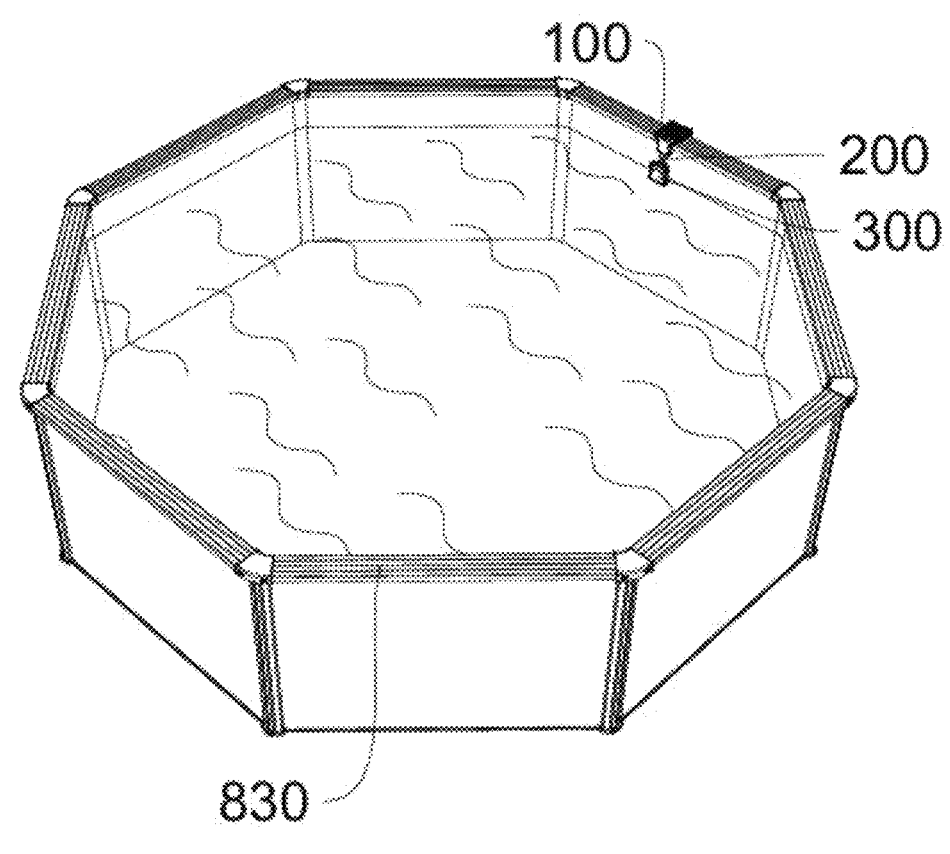
FIG. 33 is a perspective view of a swimming pool wall light installed on a steel pool according to some embodiments of the present disclosure.

As shown in FIGS. 3, 25, and 26, in some embodiments, a rechargeable battery 350 is arranged within the light body 300. The rechargeable battery 350 is electrically connected to the control circuit board 700, allowing the control circuit board 700 to process and transmit the electricity generated by the solar panel 110 to the battery 350, achieving efficient energy storage. On cloudy days or at night, the rechargeable battery 350 provides power to the light body 300, display screen 120, and temperature probe 400, maintaining their normal operation and improving the device's battery life and flexibility. The rechargeable battery 350 eliminates the need for an external power supply, eliminating the need for additional power wiring for the swimming pool wall light. This not only avoids the installation difficulties and safety hazards associated with wiring around the pool, but also utilizes clean energy throughout, making the swimming pool wall light safer and more environmentally friendly. In some embodiments, the rechargeable battery 350 can also be arranged within the base 100. In some embodiments, a control button 130 is provided on the base 100. The control button 130 directly switches the operating state of the light body 300, such as turning the light on and off, adjusting the brightness level, or switching between different light colors. Furthermore, the control button 130 can also switch the temperature displayed on the display screen 120 between different units (e.g., Celsius and Fahrenheit), making it easier for users with different usage habits to read temperature. In some embodiments, the display screen 120 can also display other information about the swimming pool wall light, such as the current lighting mode of the light body 300 and the remaining charge of the rechargeable battery 350. This allows users to more clearly understand the device status and pool environment through the display screen 120, further enhancing user experience of the swimming pool wall light.

In some embodiments, as shown in FIGS. 2-5, the swimming pool wall light also includes a fixing assembly 500. The fixing assembly 500 serves as an intermediate component connecting the base 100 to the pool edge, enabling the base 100 to be securely mounted to the pool edge. The bottom of the base 100 is detachably connected to the fixing assembly 500. When the light body 300 or the base 100 needs to be repaired or replaced, the base 100 and the light body 300 can be directly removed from the fixing assembly 500 without removing the fixing assembly 500 from the pool edge. Furthermore, users can choose different types of fixing assemblies 500 to suit different installation scenarios (e.g., different types of pools), ensuring a secure and comfortable installation in various scenarios.

In some embodiments, the bottom of the base 100 is defined with an socket 140, and the fixing assembly 500 is inserted into the socket 140 to achieve a detachable connection between the base 100 and the fixing assembly 500.

As shown in FIGS. 4, 9-11, in some embodiments, an elastic fixing button 510 is provided on the fixing assembly 500. The elastic fixing button 510 is deformable, contracting when subjected to force and automatically returning to its original position after the force is released. Furthermore, the elastic fixing button 510 is defined with inclined guide surfaces 151 on both sides of the elastic fixing button 510 along the direction of the socket 140, namely a first guide surface 151a and a second guide surface 151b. A fixing slot 150 is formed on the inner wall of the socket 140.

When the fixing assembly 500 is inserted into the socket 140, the first guide surface 151a on one side of the elastic fixing button 510 will first contact the inner wall of the socket 140. The guide surface 151 will be squeezed by the inner wall to drive the elastic fixing button 510 to elastically shrink toward the inner side of the fixing assembly 500; until the elastic fixing button 510 is just aligned with the fixing slot 150, the elastic fixing button 510 will get rid of the squeezing of the inner wall of the socket 140, and pop out and get stuck in the fixing slot 150 under the action of its own elastic force. At this time, the fixing assembly 500 is inserted in and installed in place, and a physical lock is formed between the elastic fixing button 510 and the fixing slot 150, thereby limiting the relative sliding between the fixing assembly 500 and the socket 140. This can effectively prevent the base 100 and the fixing assembly 500 from sliding relative to each other or falling off due to external force during use, thereby improving the stability of the fixing assembly 500 and the base 100. To separate the fixing assembly 500 from the base 100, simply pull the fixing assembly 500 in the removal direction. The second guide surface 151b of the elastic fixing button 510 will contact the edge of the fixing slot 150, causing the elastic fixing button 510 to deform inward of the fixing assembly 500 again and disengage from the fixing slot 150. Continue pulling the fixing assembly 500 to smoothly remove it from the socket 140, making the operation convenient and simple. In some embodiments, a guide strip 160 is provided on one sidewall of the socket 140 of the base 100, and the guide strip 160 is arranged along the extension direction of the socket 140. A guide groove 520 is provided on one side of the fixing assembly 500. When the fixing assembly 500 is inserted into the socket 140, the guide strip 160 simultaneously engages the guide groove 520 to guide the insertion of the fixing assembly 500. This prevents left-right deviation, tilting, or jamming during insertion, ensuring that the fixing assembly 500 slides smoothly in the pre-set direction and enhancing the insertion stability of the fixing assembly 500.

In some embodiments, two sets of guide strips 160 are arranged parallel on the left and right walls of the socket 140, while two sets of guide grooves 520 are respectively provided on the left and right sides of the fixing assembly 500. The two guide strips 160 provide balanced constraints on both sides of the fixing assembly 500, preventing loosening caused by unilateral force, achieving a more stable and smooth insertion. Furthermore, the cooperation between the guide strips 160 and the guide grooves 520 prevents the fixing assembly 500 from disengaging from the socket 140, further enhancing the installation stability of the fixing assembly 500.

In some embodiments, as shown in FIGS. 9-11 and 27-29, the fixing assembly 500 is defined with a fixing hole 530. A fixing bolt can pass through the fixing hole 530 and directly connect to the ground at the edge of the pool, securing the fixing assembly 500 to the ground at the edge of the in-ground pool 810. This rigid connection between the fixing assembly 500 and the ground protects against external forces such as wind, water flow, and accidental collisions, ensuring that the fixing assembly 500 itself does not move. Once the fixing assembly 500 is securely fixed, the base 100 is connected to the fixing assembly 500 to stably mount the swimming pool wall light to the edge of the in-ground pool, achieving a secure installation.

In some embodiments, as shown in FIGS. 6-12 and 30-31, the fixing assembly 500 includes an assembly body 540, a first clamping plate 550, a second clamping plate 560, and an adjusting screw 570. The first clamping plate 550 is fixedly mounted to the first side 542 of the assembly body 540. The second clamping plate 560 is slidably mounted on the second side 543 of the assembly body 540 and can slide along the first direction Y to move toward or away from the first clamping plate 550. The second side 543 of the assembly body 540 is defined with a first through hole 541, the first clamping plate 550 is defined with a second through hole 551, and the second clamping plate 560 is defined with a threaded hole 561. The first through hole 541, the threaded hole 561, and the second through hole 551 all extend along the first direction Y. The adjusting screw 570 sequentially passes through the first through hole 541 of the assembly body 540 and the threaded hole 561 of the second clamping plate 560, and finally passes into the second through hole 551 of the first clamping plate 550. A threaded connection is formed between the adjusting screw 570 and the threaded hole 561 of the second clamping plate 560, and the adjusting screw 570 is rotationally connected to both the first through hole 541 and the second through hole 551. The adjusting screw 570 is defined with a limiting groove 572, and a limiting member 554 is installed in the first clamping plate 550. The limiting member 554 is engaged with the limiting groove 572 of the adjusting screw 570, thereby limiting the movement of the adjusting screw 570 in the first direction Y. An adjusting handle 571 connected to the adjusting screw 570 is provided on the side of the first through hole 541 facing away from the first clamping plate 550.

When the fixing assembly 500 needs to be fixed, the edge of the above ground swimming pool 820 is placed between the first clamping plate 550 and the second clamping plate 560. The adjusting handle 571 is then used to rotate the adjusting screw 570, driving the second clamping plate 560 to slide along the first direction Y, causing the second clamping plate 560 to move toward the first clamping plate 550 until the first clamping plate 550 and the second clamping plate 560 tightly clamp the edge of the above ground swimming pool 820, thereby fixing the fixing assembly 500 to the edge of the above ground swimming pool 820. When the swimming pool wall light needs to be removed or the position of the swimming pool wall light needs to be adjusted, the adjusting handle 571 is used to rotate the adjusting screw 570 in the opposite direction, driving the second clamping plate 560 to move away from the first clamping plate 550 through the adjusting screw 570, thereby releasing the first clamping plate 550 and the second clamping plate 560 from the edge of the above ground swimming pool 820, allowing the swimming pool wall light to be removed or the position of the swimming pool wall light to be adjusted. The fixing assembly 500 features an adjustable clamping structure, allowing the swimming pool wall light to adapt to above ground swimming pools 820 with varying edge thicknesses. Furthermore, the threaded drive between the adjusting screw 570 and the threaded hole 561 is self-locking, preventing loosening due to vibration or external forces after clamping, thus ensuring both installation flexibility and secure fixation.

In some embodiments, both the side of the first clamping plate 550 near the second clamping plate 560 and the side of the second clamping plate 560 near the first clamping plate 550 are equipped with anti-slip rubber pads 580. These pads increase friction with the edge of the above ground swimming pool 820 and enhance the clamping stability of the fixing assembly 500. As the second clamping plate 560 approaches the first clamping plate 550 and clamps the pool edge, the pads 580 deform slightly due to compression. This not only cushions the rigid contact during the clamping process, preventing scratches and damage to the pool edge caused by the clamping plate, but also adapts to the shape and surface irregularities of the above ground swimming pool 820, ensuring uniform force across the clamping surface.

In some embodiments, the surface of the non-slip rubber pad 580 is also provided with anti-slip textured pattern to increase the contact friction between the first clamping plate 550 and the edge of the above ground swimming pool 820, and the contact friction between the second clamping plate 560 and the edge of the above ground swimming pool 820.

In some embodiments, the end surface of the first clamping plate 550 near the second clamping plate 560 and the end surface of the second clamping plate 560 near the first clamping plate 550 are both configured as curved clamping surfaces, and the shape of the curved clamping surfaces matches the shape of the edge of the above ground swimming pool 820. When clamping the curved edge of the pool, the curved clamping surfaces can form a tight contact with the edge of the above ground swimming pool 820, firmly securing the fixing assembly 500 to the edge of the above ground swimming pool 820.

In some embodiments, as shown in FIGS. 13-17 and 32-33, the fixing assembly 500 includes: an assembly body 540, a first clamping plate 550, a second clamping plate 560, and a first spring 590. The first clamping plate 550 is fixedly mounted on the first side 542 of the assembly body 540. The second clamping plate 560 is slidably mounted on the second side 543 of the assembly body 540 and can slide in the first direction Y to move toward or further away from the first clamping plate 550. A first spring 590 is mounted between the first clamping plate 550 and the second clamping plate 560, with its ends connected to the first clamping plate 550 and the second clamping plate 560, respectively. The first spring 590 is a tension spring and, in its natural state, generates a contraction force that pulls the second clamping plate 560 toward the first clamping plate 550.

When the fixing assembly 500 needs to be installed, it is only necessary to pull the second clamping plate 560 to overcome the elastic force of the first spring 590 and move it away from the first clamping plate 550 until a gap sufficient to accommodate the edge of the steel swimming pool 830 is formed between the first clamping plate 550 and the second clamping plate 560; after placing the edge of the steel swimming pool 830 into the gap, it is only necessary to loosen the second clamping plate 560, the first spring 590 will automatically rebound and drive the second clamping plate 560 toward the first clamping plate 550, and finally, through the elastic force of the first spring 590, the first clamping plate 550 and the second clamping plate 560 jointly clamp the edge of the steel swimming pool 830, completing the fixation of the fixing assembly 500. To remove or adjust the fixing assembly 500, the second clamping plate 560 is pulled, overcoming the elastic force of the first spring 590 and moving away from the first clamping plate 550. This releases the first clamping plate 550 and the second clamping plate 560 from the edge of the steel pool 830, allowing the fixing assembly 500 to be removed or adjusted. The elastic clamping structure of the fixing assembly 500, configured as the first spring 590, allows for quick manual installation without tools, adapting to steel pools 830 with varying edge thicknesses.

In some embodiments, the second clamping plate 560 includes a clamping plate body 562, a sliding plate 563, and a second spring 564. The clamping plate body 562 is slidably mounted on the assembly body 540. As the clamping plate body 562 slides relative to the assembly body 540, the sliding plate 563 and the second spring 564 move synchronously with the clamping plate body 562. The sliding plate 563 is slidably mounted underside of the clamping plate body 562 and is slidable in the vertical direction X. A second spring 564 is mounted between the clamping plate body 562 and the sliding plate 563, with its ends connected to the clamping plate body 562 and the sliding plate 563, respectively. The second spring 564 is a tension spring that generates an upward pulling force in its natural state, pulling the sliding plate 563 toward the clamping plate body 562. An abutment plate 566 is provided on the bottom of the sliding plate 563 near the first clamp 550.

When the second clamping plate 560 and the first clamping plate 550 are jointly clamping the edge of the steel pool 830, the sliding plate 563 is pulled, causing it to overcome the tension of the second spring 564 and move away from the clamping plate body 562 until a gap is formed between the clamping plate body 562 and the sliding plate 563 sufficient to accommodate the edge of the steel pool 830. After the outer edge of the steel pool 830 is placed in the gap, the sliding plate 563 is simply released. The second spring 564 automatically rebounds, and the abutment plate 566 of the sliding plate 563 fits and presses against the outer bottom of the edge of the steel pool 830. The abutment plate 566 and the assembly body 540 work together in the vertical direction X to clamp the outer edge of the steel pool 830, thereby improving the stability of the fixing assembly 500.

In some embodiments, the sliding plate 563 is defined with a third sliding groove 565 along the vertical direction X. The clamping plate body 562 slides within the third sliding groove 565 to achieve a sliding connection between the sliding plate 563 and the plate body 562.

In some embodiments, the first spring 590 is connected to the first clamping plate 550 using a detachable hook structure. A connecting hook 591 is provided at the end of the first spring 590 proximal to the first clamping plate 550. The first clamping plate 550 is defined with a third through hole 552 and a fourth through hole 553, which cooperate to form a hooking space. During installation, the connecting hook 591 is inserted into the third through hole 552 and then extended from the fourth through hole 553, so that the connecting hook 591 is hooked between the third through hole 552 and the fourth through hole 553, completing the securement. To remove or replace the spring, pull the first spring 590 outward, causing the connecting hook 591 to slightly deform despite its own elasticity, freeing it from the restraint of the fourth through hole 553. The connecting hook 591 can then be withdrawn from the third through hole 552 to complete the removal process, without the need for tools. This structure ensures the connection reliability of the first spring 590 while also enabling quick assembly and disassembly of the first spring 590. In some embodiments, the other end of the first spring 590 is connected to the second clamping plate 560 using a similar structure. The two ends of the second spring 564 are connected to the clamping plate body 562 and the sliding plate 563 using the same structure, respectively.

In some embodiments, as shown in FIGS. 18-24, the connecting rod 200 includes a first rod 210 and a second rod 220. The inner side of the second rod 220 along its axial direction is defined with a first sliding cavity 221. The first insertion end of the first rod 210 can be slidably inserted into the first sliding cavity 221. Adjusting the insertion depth of the first rod 210 within the first sliding cavity 221 changes the overall length of the connecting rod 200. The length adjustment structure of the connecting rod 200 allows for flexible adjustment of the height of the light body 300 to meet lighting requirements at different water levels.

In some embodiments, a plurality of first positioning blocks 211 are spaced apart along the outer side of the first rod 210 along its extension direction, while a plurality of first positioning buttons 222 are provided on the inner wall of the first sliding cavity 221. As the first rod 210 slides along the first sliding cavity 221 to adjust the overall length of the connecting rod 200, when the first rod 210 reaches the target position, the corresponding first positioning block 211 engages with the corresponding first positioning button 222 on the inner wall of the first sliding cavity 221, preventing relative sliding between the first rod 210 and the second rod under load. This ensures stable fixation of the connecting rod 200 after telescopic adjustment. The provision of multiple first positioning blocks 211 allows for flexible length adjustment of the connecting rod 200 between multiple positions while also ensuring reliable fixation at each position.

In some embodiments, the first insertion end of the first rod 210 protrudes laterally to form a first anti-slip ring 212, while the inner wall of the first sliding cavity 221 is provided with a first anti-slip block 223. When the connecting rod 200 is adjusted to its maximum length, the first anti-slip ring 212 abuts against the first anti-slip block 223, preventing the first rod 210 from slipping out of the first sliding cavity 221 of the second rod 220.

In some embodiments, the light body 300 is defined with a second sliding cavity 310 along the extension direction of the connecting rod 200. The second end 202 of the connecting rod 200 is slidably inserted into the second sliding cavity 310. By adjusting the insertion depth of the second end 202 of the connecting rod 200, the position of the light body 300 relative to the connecting rod 200 can be changed to meet lighting requirements at different water levels. Similarly, a plurality of second positioning blocks 224 are arranged at intervals along the extension direction of the outer side of the connecting rod 200, and a plurality of second positioning buttons 311 are provided on the inner wall of the second sliding cavity 310. The cooperation between the second positioning button 311 and the second positioning block 224 can not only realize the positioning between the connecting rod 200 and the second sliding cavity 310, but also fix the light body 300 in the position after sliding. The second end 202 of the connecting rod 200 protrudes to the circumferential side to form a second anti-slip ring 225, and a second anti-slip block 312 is provided on the inner wall of the second sliding cavity 310. When the connecting rod 200 reaches the maximum adjustment length, the second anti-slip ring 225 cooperates with the second anti-slip block 312 to prevent the second end 202 of the connecting rod 200 from falling out of the second sliding cavity 310.

The retractable design of the connecting rod 200 and the second sliding cavity 310, which allows for sliding adjustment within the connecting rod 200, further extends the height adjustment range of the light body 300. This allows the light body 300 to illuminate both deep and shallower areas, easily meeting lighting requirements across varying water depths. For storage or transport, the connecting rod 200 can be retracted to its shortest position while the light body 300 slides along the second sliding cavity 310 to a position close to the base of the connecting rod 200. This dual retractable design significantly reduces the vertical dimensions of the swimming pool wall light, effectively reducing the overall storage and packaging volume, thereby saving packaging and logistics costs.

In some embodiments, to ensure a stable electrical connection between the control circuit board 700 on the base 100 and the light body 300 and rechargeable battery 350, a wire passage cavity 213 is provided axially within the first rod 210. After exiting the base 100, the wire 600 passes through the wire passage cavity 213 of the first rod 210, the first sliding cavity 221 of the second rod 220, and the second sliding cavity 310 of the light body 300, ultimately electrically connecting to the light body 300. The wire 600 is completely concealed within the interior spaces of the connecting rod 200, the first sliding cavity 221, and the second sliding cavity 310. This prevents the wire 600 from being exposed to water, moisture, or damage from external forces, while ensuring continuous and reliable power transmission and signal exchange between the base 100 and the light body 300.

In some embodiments, as shown in FIGS. 2, 18, 23, and 24, the first end 201 of the connecting rod 200 is rotatably connected to the base 100. When packaging or transport is required, the connecting rod 200 can be flipped and folded toward the base 100, with the connecting rod 200 and the light body 300 resting against the base 100. This folding action significantly reduces the size of the swimming pool wall light, leading to lower storage and packaging volume, and lowering shipping costs. In the folded state, the components fit snugly together, reducing impact wear and tear caused by shaking during transport, thereby improving product safety.

In some embodiments, a rotating seat 230 is provided at the first end 201 of the connecting rod 200, and a corresponding rotating groove 170 is defined on the base 100. The rotating seat 230 is hinged within the rotating groove 170, thereby enabling a rotatable connection between the connecting rod 200 and the base 100. When the connecting rod 200 is extended outward, the rotating seat 230 is blocked by the first sidewall 171 of the rotating groove 170, preventing the connecting rod 200 and the light body 300 from tilting excessively outward, ensuring optimal use. When folded, the rotating seat 230 can only rotate toward the base 100 and cannot be flipped in the opposite direction. The first sidewall 171 of the rotating groove 170 physically limits the rotating seat 230, ensuring that the connecting rod 200 can only fold toward the base 100. This reduces the possibility of misoperation, enhances the support stability of the connecting rod 200, and mitigates the risk of angular deviation caused by external forces.

In some embodiments, as shown in FIGS. 25-26, the light body 300 includes a light holder 320, a light panel 330, a lightshade 340, and a rechargeable battery 350. The lightshade 340 is a highly transparent cover that is secured to the light holder 320 via snap-fit or screws. When assembled, the two together form a sealed and waterproof housing 360. The light panel 330 and rechargeable battery 350 are installed within the housing 360, avoiding direct contact with the pool water.

In some embodiments, a plurality of waterproof grooves 321 are recessed into the edge of the light holder 320. An annular waterproof ring 322 is installed within the waterproof grooves 321. The light panel 330 is provided with a plurality of waterproof protrusions 341. When the light holder 320 and lightshade 340 are installed, the waterproof protrusions 341 of the light panel 330 engage with the waterproof grooves 321 of the light holder 320 and compress the waterproof ring 322 within the waterproof grooves

321, causing the waterproof ring 322 to elastically deform and fill the waterproof grooves. This effectively prevents pool water, mist, or moisture from infiltrating into the housing 360, thereby preventing short circuits in the light panel 330 and damage to the rechargeable battery 350 due to moisture, ensuring long-term stable operation of the light body 300 in underwater or humid environments.

In some embodiments, the edge of the light holder 320 is defined with a plurality of waterproof grooves 321. An annular waterproof ring 322 is installed within the waterproof grooves 321. The light panel 330 is provided with a plurality of waterproof protrusions 341. When the light holder 320 and lightshade 340 are installed, the waterproof protrusions 341 of the light panel 330 fit into the waterproof grooves 321 of the light holder 320 and compresses the waterproof ring 322 within the waterproof grooves 321, effectively preventing pool water, mist, or moisture from infiltrating into the housing 360. This prevents short circuits in the light panel 330 and damages to the rechargeable battery 350 due to moisture, ensuring long-term stable operation of the light body 300 in underwater or humid environments.

In some embodiments, the temperature probe 400 is positioned at the bottom of the second sliding cavity 310. A fifth through hole 313 is defined in the sidewall of the second sliding cavity 310. Pool water can flow into the second sliding cavity 310 through the through hole, allowing the temperature probe 400 to directly contact the water, thereby accurately detecting the pool water temperature and ensuring direct and accurate water temperature detection.

Based on the above description, the embodiments of the present disclosure achieve the following technical effects.

The light body 300 is arranged with a temperature probe 400. The temperature probe 400 can directly contact the water in the swimming pool to detect the water temperature in real time. A display screen 120 is installed on the base 100. The temperature data detected by the temperature probe 400 can be transmitted to the base 100 via the wire 600, and the real-time water temperature feedback from the temperature probe 400 is displayed on the display screen 120, allowing users to monitor the swimming pool's water temperature status at any time.

The connecting rod 200 features a telescopic adjustment structure, which allows the overall length of the connecting rod 200 to be altered. This length adjustment mechanism enables flexible height adaptation to meet different lighting requirements.

The above descriptions are merely some embodiments of the present disclosure and are not intended to limit the present disclosure. Various modifications and changes may be made to the present disclosure by those skilled in the art. Any modifications, equivalent substitutions, improvements, etc., made within the spirit and principles of the present disclosure shall fall within the scope of protection of the present disclosure.

The invention claimed is:

1. A solar swimming pool wall light comprising:

a base mounted on an edge of a pool, the base being provided with a solar panel and a display screen;

a connecting rod having a first end and a second end, the first end being connected to the base and the second end extending downward;

a light body connected to the second end of the connecting rod;

a control circuit board arranged within the base and being electrically connected to the solar panel, the display screen, and the light body; and a temperature probe arranged on the light body, at least a portion of the light body being configured to extend into pool water to allow the temperature probe to contact the pool water and detect a temperature of the pool water; data detected by the temperature probe being configured to be transmitted and displayed on the display screen.

2. The solar swimming pool wall light according to claim 1, further comprising: a rechargeable battery arranged within the base and/or the light body, the rechargeable battery being electrically connected to the control circuit board.

3. The solar swimming pool wall light according to claim 1, further comprising: a control button arranged on the base, the control button being electrically connected to the control circuit board to control a display status of the display screen and/or a lighting status of the light body.

4. The solar swimming pool wall light according to claim 1, wherein the light body is defined with a sliding cavity extending in a vertical direction; the second end of the connecting rod is slidably mounted in the sliding cavity and configured to be fixed in a selected position of the second sliding cavity.

5. The solar swimming pool wall light according to claim 1, wherein the first end of the connecting rod is rotatably connected to the base to allow the connecting rod to be folded toward the base.

6. The solar swimming pool wall light according to claim 1, wherein the connecting rod comprises a first rod and a second rod, the second rod is connected to the light body, the second rod defines a first sliding cavity extending axially along the second rod; the first rod is slidably mounted in the first sliding cavity and configured to be fixed in a selected position of the first sliding cavity.

7. The solar swimming pool wall light according to claim 1, further comprising a fixing assembly detachably mounted on a bottom of the base.

8. The solar swimming pool wall light according to claim 7, wherein the bottom of the base is defined with a socket, and the fixing assembly is configured to be inserted into the socket.

9. The solar swimming pool wall light according to claim 8, wherein a fixing button is provided on the fixing assembly, and an inner wall of the socket is defined with a fixing slot, the fixing button engages with the fixing slot to lock the fixing assembly in the socket in response to the fixing assembly reaching a predetermined insertion position during insertion into the socket.

10. The solar swimming pool wall light according to claim 8, wherein a guide strip is provided on a sidewall of the socket along an extension direction of the socket, and the fixing assembly is defined with a guide groove, the guide strip engages with the guide groove to guide the fixing assembly in response to the fixing assembly being inserted into the socket.

11. The solar swimming pool wall light according to claim 7, wherein the fixing assembly is defined with a fixing hole, a fixing bolt is configured to be passed the fixing hole to mount the fixing assembly to a ground.

12. The solar swimming pool wall light according to claim 7, wherein the fixing assembly comprises: an assembly body, a first clamping plate, a second clamping plate, and an adjusting screw; the first clamping plate is fixed to a first side of the assembly body; the second clamping plate is slidably mounted on a second side of the assembly body and configured to move toward or away from the second clamping plate in a first direction.

13. The solar swimming pool wall light according to claim 12, wherein the second side of the assembly body is defined with a first through hole, the first clamping plate is defined with a second through hole, and the second clamping plate is defined with a threaded hole; the adjusting screw extends through the first through hole, the threaded hole, and the second through hole in sequence in the first direction; the adjusting screw is rotatably connected to the first through hole and the second through hole, respectively, and is threadedly connected to the threaded hole; the adjusting screw is configured to be rotated to drive the second clamping plate toward or away from the first clamping plate.

14. The solar swimming pool wall light according to claim 7, wherein the fixing assembly comprises: an assembly body, a first clamping plate, a second clamping plate, and a first spring;

the first clamping plate is fixed to a first side of the assembly body, the second clamping plate is slidably mounted on a second side of the assembly body, and the second clamping plate is configured to move toward or away from the second clamping plate in a first direction; the first spring has two ends connected to the first clamping plate and the second clamping plate, respectively; the first spring is configured to pull the second clamping plate toward the first clamping plate.

15. The solar swimming pool wall light according to claim 14, wherein the second clamping plate comprises: a clamping plate body, a sliding plate, and a second spring;

the sliding plate is slidably mounted on an underside of the clamping plate body, and the sliding plate is configured to move toward or away from the clamping plate body in a vertical direction; the second spring has two ends connected to the clamping plate body and the sliding plate, respectively; the second spring is configured to pull the sliding plate toward the clamping plate body.

* * * * *